June 11, 1935. P. J. McCULLOUGH ET AL 2,004,290
AMUSEMENT DEVICE
Filed Dec. 16, 1932     5 Sheets-Sheet 1
Fig.1
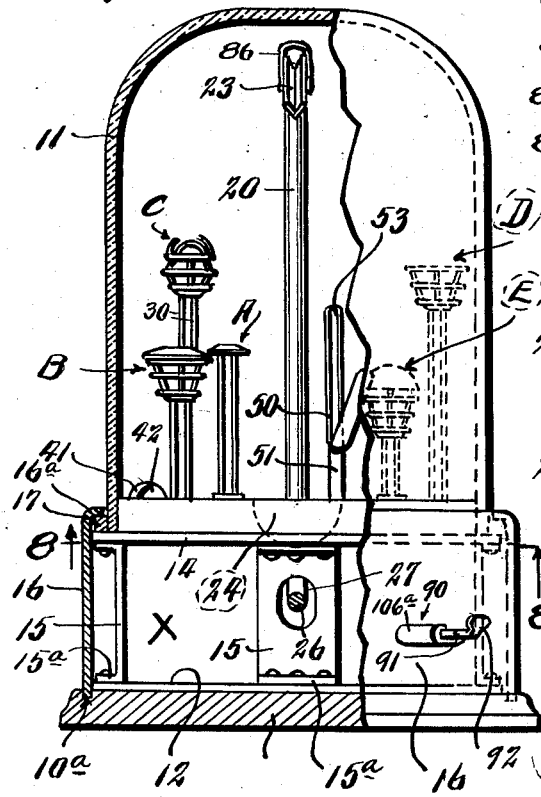
Fig.2
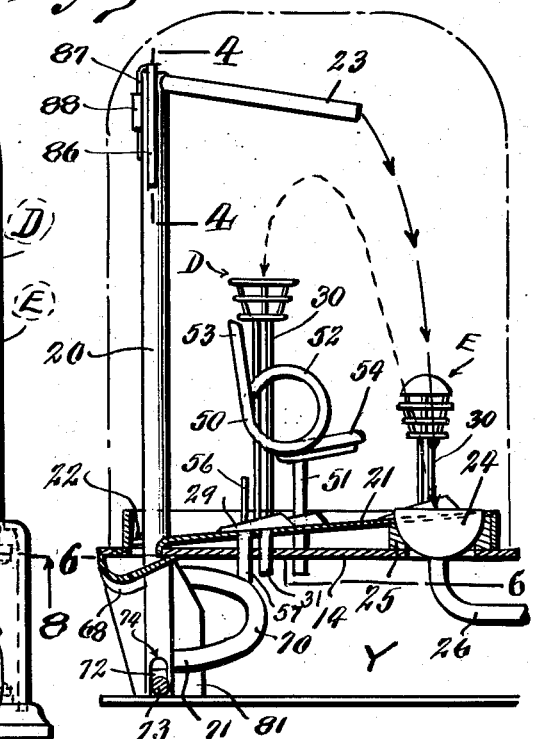
Fig.3
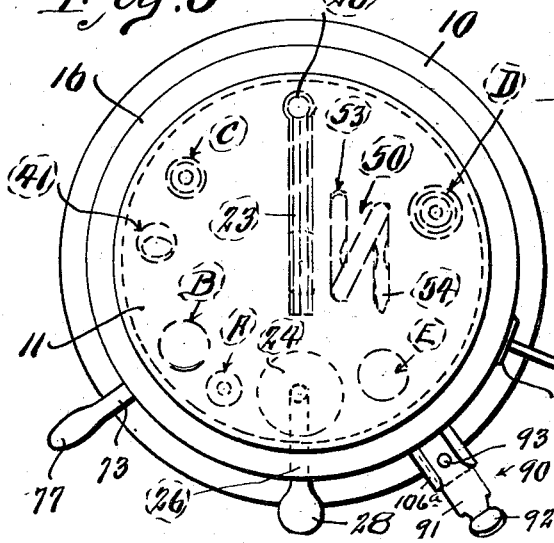
Fig.4
Fig.5
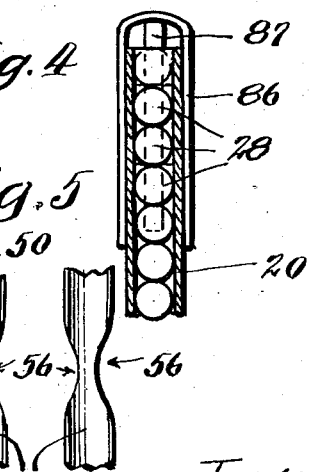
Inventors
Paul J. McCullough
Alexander H. Sullivan
By William Janus
Atty.

June 11, 1935.  P. J. McCULLOUGH ET AL  2,004,290
AMUSEMENT DEVICE
Filed Dec. 16, 1932  5 Sheets-Sheet 2
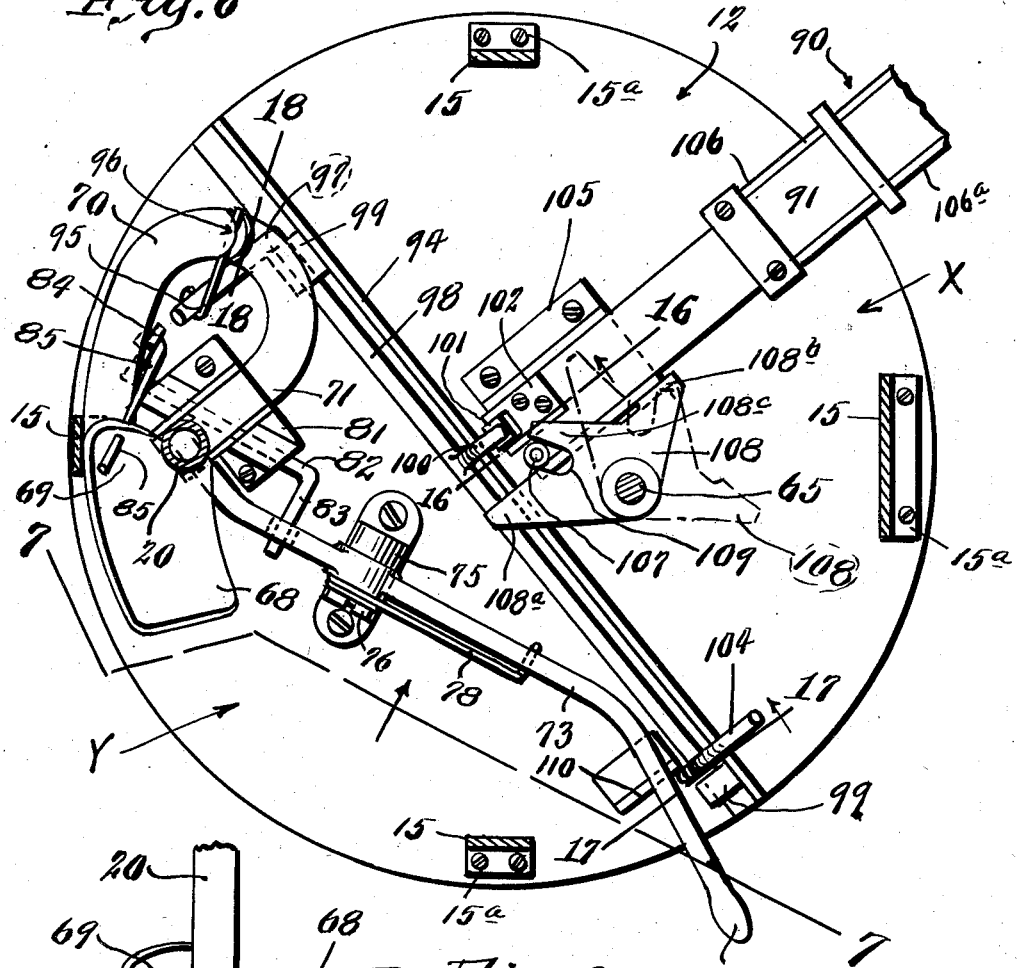
Inventors
Paul J. McCullogh
Alexander H. Sullivan
By William Janus
Atty.

June 11, 1935. P. J. McCULLOUGH ET AL 2,004,290
AMUSEMENT DEVICE
Filed Dec. 16, 1932 5 Sheets-Sheet 3
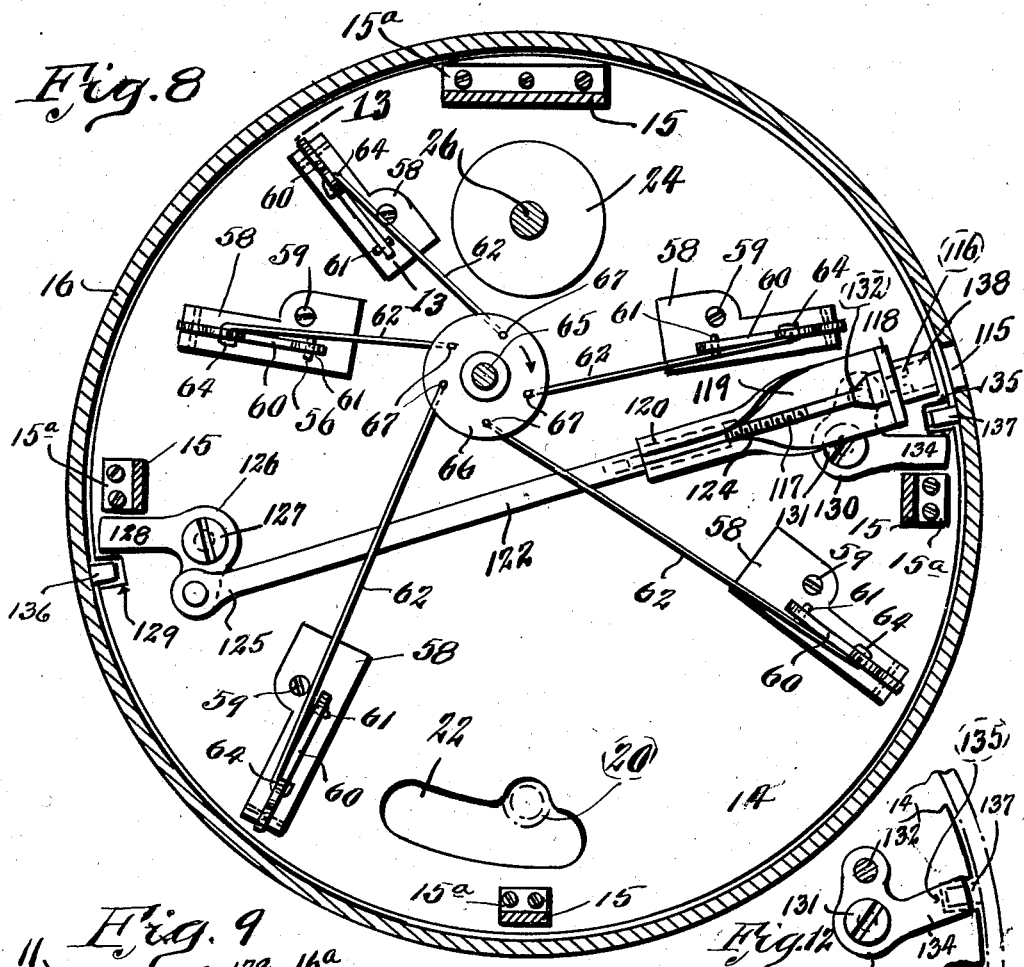
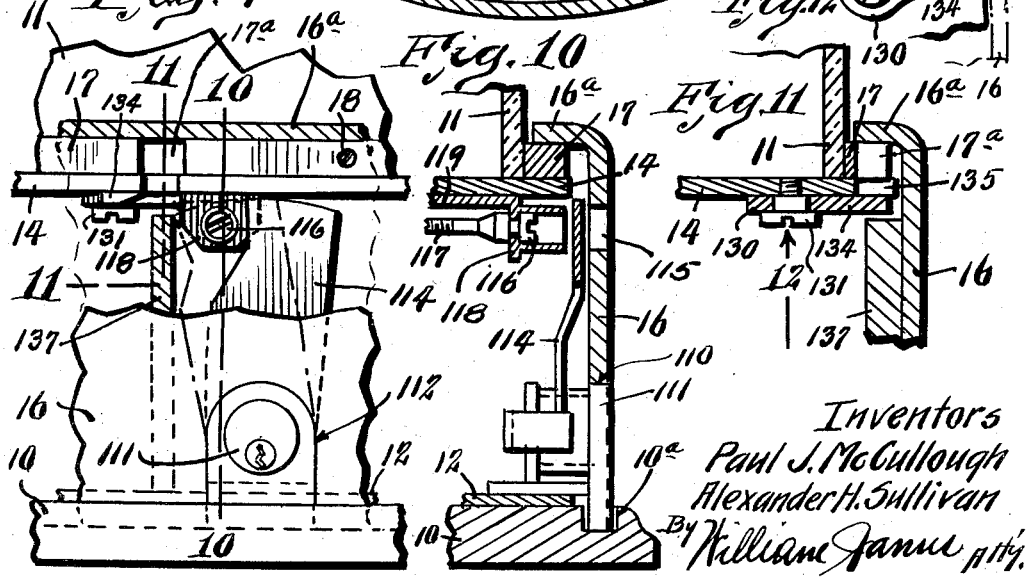
Inventors
Paul J. McCullough
Alexander H. Sullivan
By William James Atty.

June 11, 1935.  P. J. McCULLOUGH ET AL  2,004,290
AMUSEMENT DEVICE
Filed Dec. 16, 1932  5 Sheets-Sheet 4
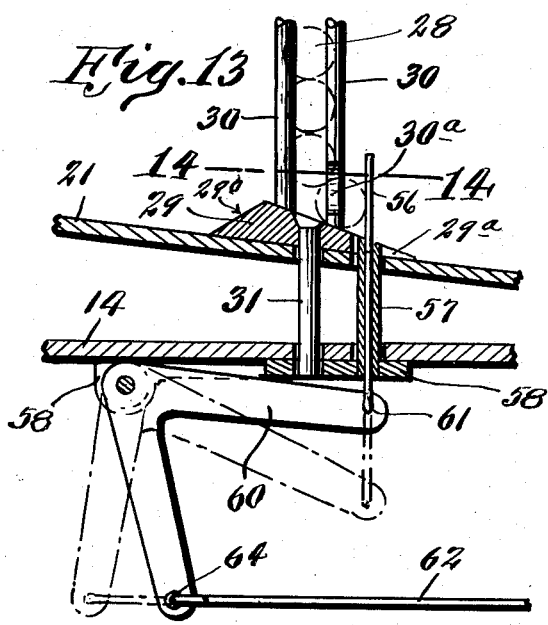
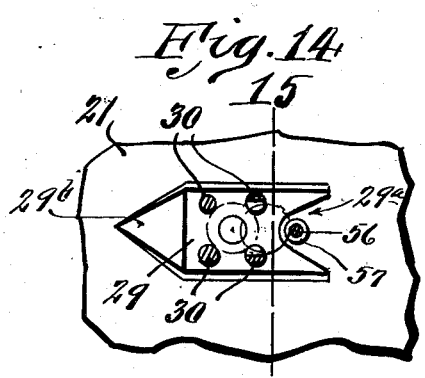
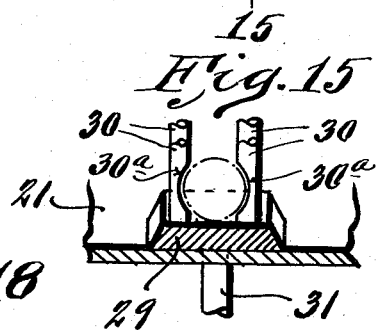
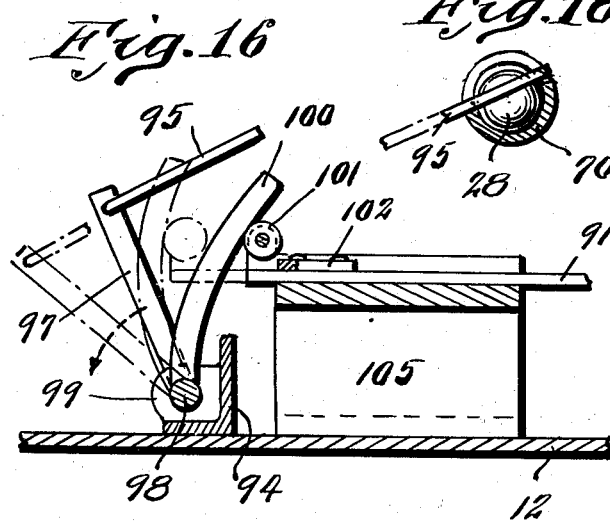
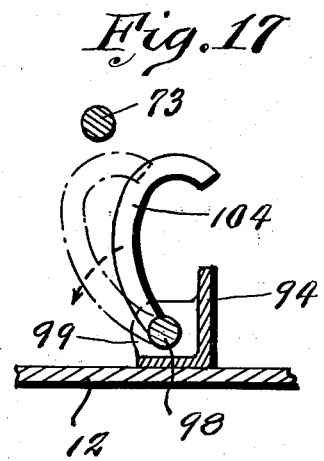
Inventors
Paul J. McCullough
Alexander H. Sullivan
By William Janney Atty.

June 11, 1935. P. J. McCULLOUGH ET AL 2,004,290
AMUSEMENT DEVICE
Filed Dec. 16, 1932 5 Sheets—Sheet 5
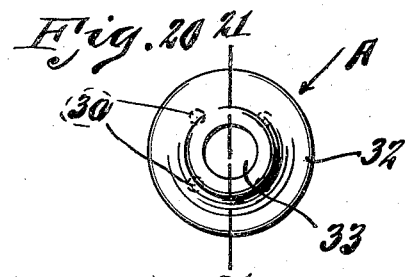
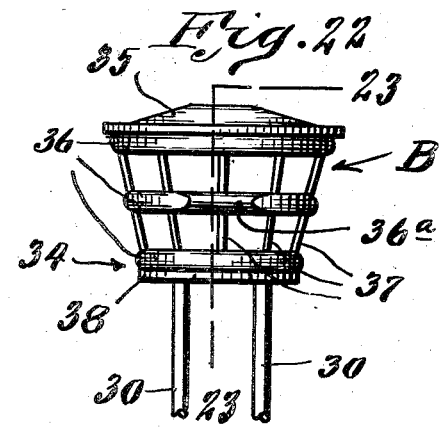
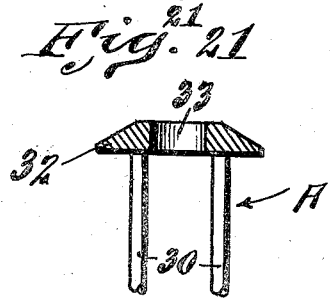
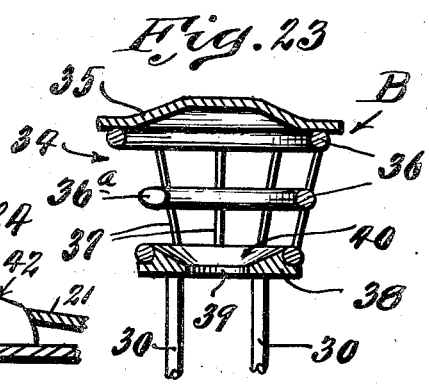
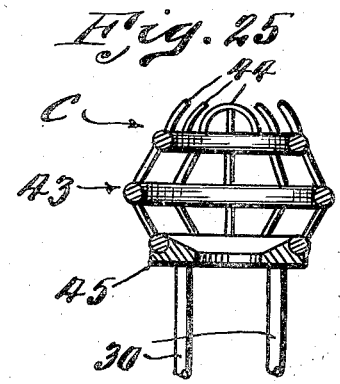
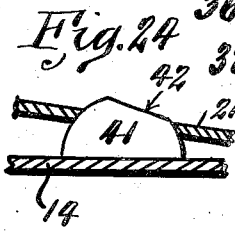
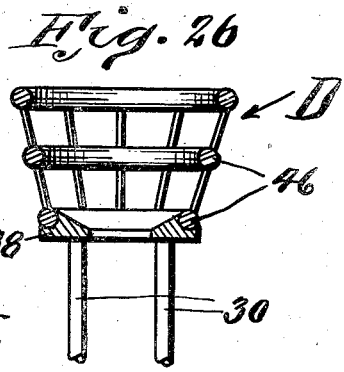
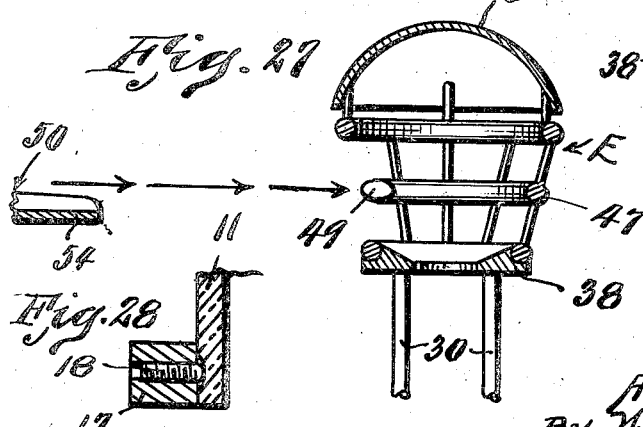
Inventors
Paul J. McCullough
Alexander H. Sullivan
By William Janne Atty.

Patented June 11, 1935

2,004,290

UNITED STATES PATENT OFFICE 2,004,290

AMUSEMENT DEVICE

Paul J. McCullough and Alexander H. Sullivan, St. Louis County, Mo.

Application December 16, 1932, Serial No. 647,518

10 Claims. (Cl. 273—101)

This invention relates to new and useful improvements in amusement devices of the type wherein a plurality of small objects, such as steel balls, are dropped on to an anvil which is manually adjustable so that said steel balls can be bounced in different directions.

Among the objects of the invention is the provision of a device having a steel anvil and means for dropping a plurality of steel balls thereonto from a predetermined height, said anvil being manually adjustable in order to deflect or bounce said steel balls in various predetermined directions.

Other objects of the invention are to provide an amusement device including a manually adjustable anvil and a plurality of loose steel balls dropped thereagainst, there being a plurality of ball receiving pockets or instrumentalities so arranged that said balls can rebound from said anvil when the latter is properly adjusted into one end of the pockets, the latter being so constructed and arranged that various degrees of skill are required to deposit the balls therein.

Further objects of the invention are to provide an amusement device of the class described wherein the balls are caused to travel in a substantially vertical plane in various predetermined directions and which device is so constructed and arranged that it occupies a minimum amount of floor space.

Still further objects of the invention are to provide an amusement device having a plurality of steel balls adapted to be dropped on to an anvil which is manually adjustable to deflect or rebound said balls in various selected directions for the purpose of depositing said balls into suitable pockets or receivers, there being means included in said device for collecting the discharged balls and feeding them in a vertical row and singly to the point of release or discharge.

Other objects of the invention are to provide an amusement device for retaining the balls deposited in various pockets and including means associated with said first mentioned means and operated by the deposit of a suitable coin to release said balls.

Additional objects of the invention are to provide an amusement device which is highly entertaining and requires a certain degree of skill to deposit the balls in the respective containers and which is so constructed that it is protected against tampering with at improper times.

With these and other objects in view, our invention consists in certain novel features of construction and arrangement of parts, hereinafter more fully described and claimed and illustrated in the accompanying drawings, in which—

Figure 1 is a front elevational view of our device, partly in cross section.

Figure 2 is a side elevational view thereof with parts of the casing removed and with certain other parts in cross section.

Figure 3 is a top plan view of Figure 1.

Figure 4 is an enlarged vertical cross section taken on line 4—4 of Figure 2.

Figure 5 is an enlarged fragmental view of the lower portion of a chute.

Figure 6 is a horizontal cross section taken on line 6—6 of Figure 2.

Figure 7 is a vertical cross section taken on line 7—7 of Figure 6.

Figure 8 is a horizontal cross section taken on line 8—8 of Figure 1 and looking in the direction indicated by arrows.

Figure 9 is an enlarged fragmental detail view, partly in cross section, of the locking means for said device.

Figure 10 is a vertical cross section taken on line 10—10 of Figure 9.

Figure 11 is a vertical cross section taken on line 11—11 of Figure 9 and showing the casing in locked position.

Figure 12 is a detail view of the locking member shown in Figure 11 with the casing member shown in dotted lines.

Figure 13 is an enlarged vertical cross section taken on line 13—13 of Figure 8.

Figure 14 is a horizontal cross section taken on line 14—14 of Figure 13.

Figure 15 is a detail cross section taken on line 15—15 of Figure 14.

Figure 16 is an enlarged vertical cross section taken on line 16—16 of Figure 6.

Figure 17 is an enlarged vertical cross section taken on line 17—17 of Figure 6.

Figure 18 is an enlarged vertical cross section taken on line 18—18 of Figure 6.

Figure 19 is an enlarged vertical cross section of the trough showing a ball positioned therein.

Figure 20 is a top plan view of one of the ball receivers or baskets.

Figure 21 is a vertical cross section taken on line 21—21 of Figure 20.

Figure 22 is a front elevational view of another ball receiver or basket.

Figure 23 is a vertical cross section taken on line 23—23 of Figure 22.

Figure 24 is an enlarged detail view of an auxiliary anvil used in connection with the basket shown in Figures 22 and 23.

Figure 25 is a vertical cross section of another ball receiving basket.

Figure 26 is a vertical cross section showing still another ball receiver or basket.

Figure 27 is a vertical cross section showing a ball receiver or basket used in conjunction with a chute, and Figure 28 is a sectional view through the ring 17 and the lower edge of bowl 11.

Referring by numerals to the accompanying drawings, 10 indicates a base which can be supported on a counter or a stand (not shown). A glass cylinder or bowl 11 rests on and extends upwardly from said base and forms an enclosure for the device. Resting on said base 10 and fixed thereto is a bottom plate 12. A top plate 14 is supported on said bottom plate in spaced parallel relation therewith by means of four legs or brackets 15. These are preferably spaced peripherally equidistant about the axis of the device and have their ends 15a secured to respective plates in any suitable manner.

The various mechanisms used in the operation of the device and hereinafter more fully described are contained between said bottom and top plates. A casing 16 encloses said plates and the mechanisms contained therebetween and the lower edge of said casing is seated in an annular upwardly presented groove 10a formed in base 10, while the upper edge of the casing is curved inwardly to form a horizontally disposed flange 16a which is disposed a suitable distance above the top plate 14.

The lower end of glass bowl 11 rests on top plate 14 and has secured thereto a ring 17. The inwardly presented edge 16a of casing 1t overlies said ring and holds the glass bowl in position so that before said bowl can be disengaged from the device, casing 16 has to be removed. Ring 17 can be secured in position to the lower edge of the bowl in any suitable manner, such as by set screws 18 screw-seated in said ring and engaging seats or depressions 19 formed in the edge of said bowl.

A stand pipe or vertically disposed delivery tube 20 is arranged in the rear portion of the device and extends upwardly from bottom plate 12 to top plate 14 and terminates a suitable distance thereabove. A floor or platform 21 is supported on top plate 14 and is arranged inclined from horizontal, sloping rearwardly toward an opening 22 formed in platform 21 adjacent to one side of stand pipe 20.

The upper end of pipe 20 is cut away at its front portion, as indicated at 20a, and extending forwardly therefrom and fixed to said pipe is a trough 23. This trough slightly inclines forwardly and the outer end thereof terminates a suitable distance from the vertical axis of an anvil 24 which latter is arranged in the platform 21 adjacent to the forward end thereof and substantially diametrically opposite to said stand pipe 20.

This anvil is substantially of semi-spherical shape with the flat base disposed substantially flush with the platform 21 and with the spherical portion loosely arranged in a ring bearing 25. This bearing is disposed on top plate 14 below said platform. A rod 26 is bent at right angle and has its vertical arm fixed to the underside of said anvil radially thereto and has its horizontal arm extending outwardly through opening 27 formed in the corresponding bracket 15. A handle 28 is fixed to the projecting end of said arm and provides means for manipulating and adjusting said anvil so that the plane face thereof can be moved or adjusted to various angles from horizontal.

The disposition of the trough 23 and the anvil 24 relatively to each other is such that a steel ball 28 of predetermined diameter rolling down said trough drops therefrom on to said anvil at or near the center thereof. When the ball strikes the face of the anvil it bounces upwardly and the angular position of the anvil determines the direction in which the ball is propelled. As both the anvil and the balls are of steel the rebound of the latter is considerable.

Located within the glass enclosure 11 and supported on said floor 21 and top plate 14 is a plurality of ball receivers spaced suitably with respect to said anvil. These receivers are marked, respectively, A, B, C, D and E.

Each receiver consists of a base 29 from which project upwardly four rods 30 which are spaced equidistant around the vertical axis of the receiver. A pin 31 is fixed to each base and extends downwardly therefrom and engages aligned apertures formed in the floor 21 and top plate 14, thereby holding the receiver in position. The rods 30 of the respective receivers are of various lengths so that said receivers are arranged at different heights. The upper end of each group of rods 30 is fixed to the receiving or apertured member through which the ball is deposited in the receiver. The rods 30 are so arranged with respect to the diameter of the balls 28 that a number of said balls can be stored or held in a vertical row between said rods until released as hereinafter described.

The receiver A is in the form of a horizontally disposed disk or collar 32 having a central opening 33 through which a ball can enter and be deposited in the space formed by said rods. The size of the opening 33 is only slightly larger than the diameter of the ball and an accurate shot is required to drop the ball into this receiver. Preferably the upper face of the disk slopes away from the central aperture. This is the hardest shot to make and consequently the receiver grades the highest score mark where the latter are used.

The next receiver B consists of a basket 34 having a closed top 35 and having three spaced rings 36 held in spaced relation by pins 37. The middle ring is cut away as indicated at 36a to provide an entrance to the basket. Preferably said rings are of various diameters, gradually decreasing downwardly. The lowermost ring has fixed thereto a collar 38 having a central aperture 39 and having its upper face sloping toward said aperture, as indicated at 40. The upper ends of the corresponding rods 30 are secured to said ring 38 and support said basket.

An auxiliary anvil 41 is arranged on plate 14 and floor 21 in spaced relation with said basket or receiver B and the plane face 42 of said anvil is disposed in opposed relationship with the opening 36a of said basket. The purpose of the play is to adjust anvil 24 so that a ball 28, upon striking said anvil, bounces therefrom in the direction of anvil 41 and strikes the face 42 thereof in such a manner that it is deflected in the direction of the basket B and enters the latter through the opening 36a.

The receiver C is located rearwardly of said auxiliary anvil 41 and to one side of stand pipe 20. This receiver consists of a basket 43 which is similar to basket 34 but has no side opening and has an open top. A plurality of projections or pins 44 are arranged on the uppermost ring and some of said pins are straight and others are arched. These pins project upwardly and inwardly so as to reduce the size of the opening of said basket. An apertured disk 45, similar to disk 38, is fixed to the lowermost ring of basket 43 and has fixed thereto the upper ends of rods 30.

The receiver D is arranged on the right side of the stand pipe 20 in the rear portion of the device. A basket 46 of the receiver is similar in construction to the two baskets previously described with the exception that the top is open and is devoid of all projections so that the opening of the basket is formed by the uppermost ring. This is the easiest shot to make and consequently carries the lowest score mark.

The receiver E consists of a basket 47 which is similar in construction to basket 34 of receiver B having a closed top 48 and having a side opening 49. Preferably the top 48 is in the form of a bell. The ball is deposited in basket 47 by means of a chute 50. This chute is arranged rearwardly of receiver E and is supported in position by a pin 51 which is fixed to said chute and extends downwardly into engagement with floor 21 and top plate 14. The chute is formed with a loop 52 and one end, or the receiving end, of the chute extends upwardly as indicated at 53 while the other end is presented toward receiver 47 as indicated at 54. When the anvil 24 is properly adjusted the ball upon leaving said anvil engages the upper end 53 of the chute, traverses the loop portion 52 thereof and then shoots upwardly and forwardly from the end 54 thereof and enters the receiver 47 through the opening 49.

Thus a plurality of receivers is provided into which the balls can be discharged by the proper adjustment of the anvil 24. The receivers vary in design and varying degrees of skill are required to deposit the balls therein. Preferably the lowermost portions 55 of chute 50 are cut away as indicated at 56 in order to reduce the width of the chute at these points and cause the discharge of balls therefrom in the event the balls do not complete their travel through the chute. In this manner the chute is kept clear at all times and the travel of the balls is not impeded by a spent ball previously discharged into the chute.

The balls delivered into each receiver are held between the respective rods 30 by a pin 56. This pin operates in a sleeve 57 which is fixed at its lower end to a support 58 and extends upwardly therefrom through aligned apertures formed in the top plate 14 and floor 21. The upper end of this sleeve terminates flush or slightly below the upper face of the corresponding base 29. Preferably the inner or lower end of each base is bifurcated, as at 29a, to receive the upper projecting end of said sleeve.

As shown, the upper face of each base slopes toward the corresponding sleeve 57. All of the receivers are so positioned that the tapered or lower ends of the base of each receiver and the corresponding sleeve 57 are presented in the direction of the slope of floor 21 and toward the opening 22. This assists in directing the balls 28 when released from the receivers in traveling in a common direction, namely, toward opening 22.

The other or high end of each base 29 is tapered, as indicated at 29b, in order to eliminate danger of a ball being accidentally caught or held by said end. In order to permit the discharge of balls 28 from between rods 30 the forward pair of each set of rods is cut away as indicated at 30a (see Fig. 15) so that the lowermost ball is free to move between said rods and is held or retained in position only by pin 56.

When the pins 56 occupy raised or normal positions (shown in full lines in Figure 13), the balls 28 are retained between the respective bars or rods 30. When said pin 56 is lowered, the balls 28 roll down the inclined face of the base on to the floor 21 and hence toward opening 22.

Each support 58 is secured to the underside of plate 14, preferably by a screw 59. Pivotally mounted on each support near the outer end thereof is a bell crank 60. The horizontal arm thereof is connected to the lower end of the corresponding pin 56, as at 61, and the vertical arm is connected to one end of a horizontally disposed rod 62, as indicated at 64.

A vertically disposed shaft 65 is journaled in suitable bearings between plates 12 and 14 inwardly of anvil 24. A horizontally disposed disk 66 is fixed on said shaft and connected to said disk as at 67 are the inner ends of rods 62 (see Fig. 8).

When shaft 65 is operated in the direction indicated by arrow in Figure 8, all of the bell cranks 60 are moved into positions shown in solid lines in Figure 13 and the pins 56 are raised.

When said shaft is actuated in the opposite direction, said bell cranks 60 are moved into positions shown in dotted lines and the pins 56 are lowered to allow the simultaneous discharge of balls 28 from all of the receivers.

The discharged balls roll toward opening 22 and drop therethrough into a pan 68. This pan is disposed below floor 21 and its open top is of substantially the same area as said opening.

The bottom of the pan slopes toward one end 69 and this end communicates with a tubular member 70 which curves downwardly and has its lower end 71 opening into the stand pipe 20 a slight distance above the lower end thereof.

Movably disposed in pipe 20 below the junction thereof with end 71 is a plunger 72 which is fixed to one end of a lever 73. A vertically disposed slot 74 is formed in the lower end of stand pipe 20 to provide operating clearance for said lever 73. A support 75 is fixed on bottom plate 12 and said lever is pivotally mounted thereon by means of a screw or pin 76. The longer arm of said lever extends outwardly beyond the plate 12 and terminates in a handle 77 by means of which said lever can be manually operated. A coiled spring 78, having one end anchored and having the other end engaging said lever, tends to hold the latter in a position whereby the handle 77 is raised and plunger 72 depressed and disposed below the end 71 of trough 70.

The balls 28 roll from pan 68 through tube 70 and enter one by one through lower end 71 the pipe 20 immediately above plunger 72. As the lever 73 is actuated, plunger 72 moves upwardly, thereby raising the ball resting thereon. This plunger moves upwardly a suitable distance so that when the ball is raised and the plunger returned to its depressed position there is sufficient clearance between the lowermost ball and the upper end of said plunger to allow another ball 28 to enter freely pipe 20.

When a ball 28 is raised by plunger 72 said ball is engaged by a pair of horizontally disposed rollers 79 and 80 which are disposed a suitable distance above plunger 72 and extend into said pipe 20 through openings formed therein at diametrically opposed points. Roller 79 is journaled in a stationary member 79a and roller 80 is journaled in a resilient member 80a. However, if desired, both rollers can be resiliently mounted. These rollers are so arranged that the distance between the peripheries thereof is less than the diameter of a ball 28. Consequently as the ball is forced upwardly by plunger 72 past said rollers the resiliently mounted roller 80 yields, permitting ball 28 to pass upwardly above said rollers. The roller 80 then springs inwardly into its normal position and in correlation with roller 79 retains the ball 28 in raised position while the plunger 72 returns to its normal depressed position (see Fig. 7).

Thus a ball 28 is fed into pipe 20 at each operation of lever 73. Normally pipe 20 is filled throughout its entire height (from plunger 72 to trough 23) with a single row of balls 28 and when said plunger is raised to move the lowermost ball past rollers 79 and 80 the uppermost ball of the column is displaced and rolls down the trough 23 and drops therefrom onto anvil 24.

If, for instance, it is desired to deposit a ball in receiver A and the anvil is properly adjusted, said ball upon rebounding from anvil 24 enters said receiver through aperture 33 and drops between rods 30 and is retained therein by the corresponding pin 56. If, however, the anvil is not properly adjusted, the shot is a miss and the ball drops on to floor 21 and rolls rearwardly through opening 22 into pan 68 in readiness for subsequent operations.

The balls deposited in the various receivers are held therein until the pins 56 are depressed. To accomplish this, shaft 65 is operated in any suitable manner (as, for instance, by a suitable coin vending mechanism hereinafter more fully described) in a direction opposite to that indicated by arrow in Figure 8. This simultaneously operates all of the bell cranks, causing them to withdraw or lower pins 56 whereupon the trapped balls roll down the inclined faces of bases 29 outwardly through the openings formed by cut-away portions 30a on to floor 21, thence through openings 22 into pan 68.

The lower end 71 of tubular member 70 and the lower end of stand pipe 20 are preferably held in position by a support 81 which is secured to plate 12. Loosely mounted in said support below the end 71 is a shaft 82 one end of which is bent, as indicated at 83, to engage the short arm of lever 73. The other end of said shaft is bent upwardly, as indicated at 84, and connected to the end thereof is a pin 85 which extends therefrom into pan 68 near the end 69 thereof. The purpose of this pin is to agitate the balls contained in pan 68 and prevent them from becoming jammed at the entrance to tubular member 70. At each operation of the lever, as the plunger 72 moves upwardly, shaft 82 is rocked away from stand pipe 20, causing pin 85 to withdraw from end 69, thereby permitting a ball to enter tubular member 70. Upon the return stroke of the lever, shaft 82 is rocked in the opposite direction, causing pin 85 to enter said pan.

In order to insure proper discharge of balls 28 into trough 23 and prevent sticking of the balls or violent movement thereof upwardly beyond trough 23, as when lever 73 is improperly actuated, a member 86 is loosely mounted on the upper end of stand pipe 20 and serves to dampen the sudden violent discharge of the balls therefrom. This member, which is of inverted U-shape, straddles the upper end of said stand pipe and is slidably mounted by means of a rearward extension 87 in a bearing 88 formed on the rear side of stand pipe 20. There is sufficient clearance between the trough opening and the member 86 so that under normal conditions the uppermost ball can be discharged without affecting said dampening member. If, however, the column of balls in stand pipe 20 is moved upwardly beyond their normal distance, as by violently striking the lever 73, the uppermost ball will engage said member 86 and the weight of the latter will check said movement and will guide the uppermost ball into the trough 23.

The device is operated upon the deposit of a coin in a suitable coin mechanism 90. This mechanism extends inwardly through casing 16 and includes a sliding member 91, the outer end of which is provided with a handle 92 and has a coin aperture 93 formed adjacent thereto. A coin is deposited in said aperture and the member 91 is pushed inwardly.

This coin mechanism is so constructed that member 91 is compelled to complete its inward movement and deposit the coin within the casing before the actuation of the device can take place. When said member 91 is pushed a predetermined distance inwardly, the coin is discharged therefrom and falls into a compartment X formed in casing 16. This compartment is formed by an angle iron 94 which is secured to floor 12 to one side of shaft 65 and forms a partition wall which divides said floor into said compartments X and Y. Compartment X receives the coins and contains shaft 65 and parts associated therewith, including the coin mechanism. Compartment Y contains lever 73, magazine tube 20, and delivery tube 70 and parts associated therewith.

As stated before, the device is operated by means of lever 73 and a ball is discharged from pipe 20 and dropped on to anvil 24 at each manual depression of said lever. A predetermined amount of balls (in the present case, 12 in number) is released into the lower portion of tube 70 and these are admitted one by one into the lower end of magazine tube 20.

At each operation of lever 73, the plunger end 72 thereof engages the lowermost ball and raises the whole column of balls contained in the magazine piece until the uppermost ball is clear of the cut-away portion of the upper end of said piece 20 and is free to roll on to the trough 23.

The admission of balls into the lower portion of tube 20 is controlled by a rod 95 which operates in a slot 96 formed in said tube. One end of this rod is connected to an arm 97 which is fixed to a rock shaft 98. This shaft is journaled in bearings 99, preferably arranged on or adjacent to angle iron 94.

When said rock shaft 98 is operated in one direction (indicated in dotted arrows in Figures 16 and 17) rod 95 is moved away from tube 70, thereby opening the passage therein and permitting the requisite number of balls to pass from the upper portion of said tube and from pan 68 into the lower portion of said tube. When said rock shaft is moved in the opposite direction, rod 95 reenters said tube and closes the passage of balls therethrough.

The coin mechanism is correlated with rock shaft 98 so that rod 95 normally occupies a position within tube 70 so as to prevent passage of balls therethrough. Said shaft 98 is operated in the opposite direction to withdraw rod 95 from tube 70 and permit passage of balls only when said coin mechanism is coin-operated.

This is accomplished through the medium of a curved arm 100 fixed to shaft 98 intermediate the ends thereof and projecting therefrom toward the inner end of said coin mechanism and a roller 101 carried by said inner end of said coin mechanism and adapted to engage said arm 100 and rock said shaft 98 from normal position upon the actuation of said coin mechanism. As shown, shaft 98 is arranged preferably at right angle to the line of movement of member 91 and parallel with roller 101. The latter is preferably mounted in a bracket 102 which is fixed to the inner end of member 91 and moves in a horizontal plane in the path of movement of arm 100.

When member 91 is pushed inwardly, roller 101 engages arm 100 and causes shaft 98 to rock, thereby causing arm 97 to assume positions shown in dotted lines in Figure 16 in which position rod 95 is withdrawn from tube 70 a sufficient distance to permit a predetermined amount of balls to roll into the lower portion of said tube. In the present instance, twelve balls are operated at each insertion of a coin and consequently the lower portion of tube 70 (that is, from slot 96 to junction with tube 20) is of a length to accommodate eleven balls. The foremost of the released balls enters the lower end of magazine tube 20 immediately above the plunger end 72 of lever 73 so that only eleven balls have to be accommodated in the lower portion of the tube 70. As lever 73 is operated, this foremost ball is forced upwardly in tube 20 past retaining rollers 79 and 80. Thus the whole column of balls in said tube 20 is moved upwardly the distance equivalent to the diameter of a ball, thereby displacing the uppermost ball of said column and causing it to be released from the magazine tube 20.

To prevent additional balls from rolling past slot 96 into the lower portion of tube 70, rod 95 is returned to its normal position in said tube simultaneously with the operation of lever 73. To this end shaft 98 is provided at its outer end with a curved arm 104 which, when said shaft 98 is actuated or depressed, moves under the handle end of said lever 73, as indicated in dotted lines in Figure 17. When said lever is depressed, it bears against said arm 104 and forces it out of the path of said lever, thereby forcing it and shaft 98 to normal positions shown in full lines in Figure 17. This, of course, causes arm 97 to move to normal position, forcing rod 95 into tube 70 thereby closing the passage, while the lower portion of said tube still contains its full quota of balls (11 in number).

The curved arm 104 serves another purpose and that is to prevent operation of lever 73 while the coin member 91 occupies its innermost position. If said member 91 is held stationary in its moved position with the object of keeping the passage in tube 70 open so that additional balls can pass downwardly, the arm 100 bears against roller 101 and prevents operation of shaft 98 so that the curved arm 104 is locked in its displaced position and prevents depression of lever 73. As soon as member 91 is released, shaft 98 is free to rock, whereby rod 95 reenters tube 70 simultaneously with the displacement of arm 104.

The coin mechanism is supported in position within casing 16 in any suitable manner and preferably by means of supports 105 and 106 which are arranged on floor 12 and extend upwardly a suitable distance therefrom, support 105 being arranged adjacent the inner end, and support 106 adjacent to the casing and having a portion 106a extending outwardly therefrom.

As mentioned before, such balls 28, as are deposited in various receivers A to D, inclusive, by the manipulation of anvil 24, are retained between wires 30 of the respective receivers by upwardly projecting pins 56 until all of the balls have been played. These pins which are operatively associated with bell cranks 60 are simultaneously retracted to release all of the trapped balls. The operation of said bell cranks is effected by rods 62 which are connected to disk 66 fixed to vertically disposed shaft 65.

The trapped balls 28 are released simultaneously by the operation of shaft 65 upon the next operation of the coin mechanism 90. A roller 107 is journaled on the inner end of sliding member 91 and projects upwardly therefrom. A horizontally disposed plate 108 is secured to the upper end of shaft 65 above said sliding member and is provided with an open-ended slot 109 which is in engagement with said roller 107. Normally said plate occupies the position as shown in dotted lines in Figure 6 and is operated upon the initial movement of the sliding member 91. As shown in this figure, this sliding member is shown moved inward a sufficient distance to discharge the coin and release the trapped balls 28 but before the actuation of shaft 98. The portion 108a of the plate is cutaway to permit continuation of the inward movement of roller 107 without further affecting said plate 108. The opposite end of said plate is provided with a downward extension 108b which when said plate is in actuated position bears against the side of support 105 and prevents overrunning of said plate.

On the return movement of member 91, roller 107 engages extension 108c of the plate formed on the opposite side of slot 109 and moves said plate to normal position, thus actuating, through connecting rods 62, pins 56 so that they assume extended or ball-retaining positions (see Figure 13). A stop 110 is provided near the handle end of lever 73 so as to limit the downward movement thereof.

The various receivers, as well as the projecting end of pipe 20, are enclosed by the glass bowl 11 which rests on floor 14. The annular casing 16 rests on base 10 and has its upper flanged end 16a overhanging the collar 17 of said bowl 11, thereby locking the latter in position. Thus to remove said glass bowl, the annular casing 16 has to be lifted upward over said bowl.

In order to prevent unauthorized removal of said bowl and to seal access to the parts enclosed thereby, said casing is locked in position on the device in such a manner that only a person having the necessary key can release said casing. In this manner the operating mechanism disposed between the plates 12 and 14 is also protected.

A tumbler lock 111 of standard construction is secured to base plate 12 and has its key end exposed through a vertically disposed downwardly opening notch 112 formed in casing 16. An upwardly projecting plate 114 is oscillatably mounted on the barrel of said lock and is operatively associated with the lock mechanism whereby when the lock occupies locked position and the key is removed, said plate is positioned rearwardly of an aperture 115 formed in said casing. This aperture is arranged in axial alignment with the operating head 116 of a rod 117 so that a suitable tool, a screw in the instant case, can be inserted through said aperture into engagement with said head to operate said rod when plate 114 occupies displaced position. When, however, said plate occupies locked position, it is interposed between said aperture 115 and said head 116, thereby preventing engagement of the tool with said head.

This rod 117 is shouldered for rotative but non-longitudinal movement in a downwardly presented bearing 118 formed on one end of plate 119. This plate is arranged on the other side of plate 14 and has its other end formed tubular, as indicated at 120 and slidably receives end 121 of a rod 122. This end 121 is formed with a screw-threaded bore in which is received the screw-threaded end 124 of rod 117.

The other end 125 of rod 122 is pivotally connected to one end of a bell crank 126. A screw 127 is fixed to the underside of plate 14 and loosely supports said bell crank in position. The other end of said bell crank forms an extension 128 which terminates adjacent to the periphery of said plate 14 and is adapted to be moved in juxtaposed relation with a notch 129 formed in the edge of said plate.

A bell crank 130 is mounted on the underside of plate 14 by a screw 131 and one end of said bell crank is pivotally attached to plate 119 as indicated at 132. The other end of said bell crank forms an extension 134 which is adapted to close a notch 135 also formed in the edge of plate 14.

These notches 129 and 135 are arranged substantially in diametrically opposed relation with each other and in vertical planes, respectively, with ribs 136 and 137, formed on casing 16. These ribs are vertically disposed and project inwardly from said casing and terminate short of plate 14 and the extensions 128 and 134 are movable into positons between said ribs and their respective notches, thereby preventing upward movement or removal of the casing. The collar 17 which is fixed to the lower end of glass bowl 11 can be provided with notches 17a so as to provide clearance for the respective ribs 136 and 137, as shown in Figure 11. However, if desired, collar 17 can be made thinner and the ribs reduced in depth so that sufficient operating clearance exists therebetween. Preferably the head 116 is enclosed by a socket 138 which serves as a guide in inserting the screw driver and also permits the operation of said head only by a tool of predetermined size.

When the device is locked, the plate 114 occupies position shown in Figure 10. When it is desired to have access to the operating mechanism or to remove the glass bowl, the lock 111 is operated by the proper key to oscillate plate 114 to one side as shown in Figure 9. This permits insertion of the proper tool through aperture 115 for engagement with the operating head 116 so that rod 117 can be turned to move rod 124 longitudinally in proper direction to operate bell cranks 126 and 130. When said bell cranks occupy locked positions, they are interposed between the ribs 136 and 137 and their respective notches, as shown in Figures 11 and 12. When rod 124 is actuated, said bell cranks are moved into positions away from their respective notches, as shown in Figure 8, whereupon the ribs 136 and 137 can enter the respective notches and the casing 16 can be raised upwardly.

The receivers can be cleared and the trapped balls 28 released without requiring the insertion of the coin in member 91. The latter is free to move inward for a predetermined distance without deposit of a coin in aperture 93. This inward movement is sufficient to operate pins 56 but not shaft 98 and the extent of this inward movement is shown in Figure 6.

To operate the device, a suitable coin is inserted in aperture 93. If member 91 occupies position as shown in Figure 6, it is moved outward to its full extent so as to expose said aperture.

When the coin is deposited, member 91 is pushed inwardly. The coin mechanism 90 is so constructed that upon the insertion of a coin in member 91 the latter, when actuated, is locked against retrograde movement and is compelled to complete its inward stroke before being released. This inward movement rocks shaft 98 and withdraws rod 95 from tube 70 and at the same time places arm 104 under lever 73. A suitable number of balls drop into the lower portion of trough 70 and the first or lowermost ball enters the lower end of pipe 20 at a point above the plunger end 72 of lever 73. When the latter is actuated, it engages curved arm 104 and cams or forces said arm out of its path, thereby causing operation of shaft 98 in opposite direction and restoring it and rod 95 to its normal positions. Simultaneously with this, the plunger end 72 of said lever is moved upwardly forcing the ball which entered the pipe 20 upwardly in said pipe into engagement with the lowermost ball of the column of balls contained in said pipe. As this pipe always contains a full number of balls, the addition of this ball upon the upward movement of said plunger end 72 raises the entire column of balls a distance equivalent to the diameter of one ball. Thus the uppermost ball is discharged from said pipe and is caused to roll downwardly in trough 23. The ball after leaving said trough strikes anvil 24 and rebounds therefrom and either enters one of the receivers or drops on to the floor 21. If the ball is discharged on to the floor it rolls rearwardly and enters, through opening 22, pan 68. The balls trapped by the receivers when released therefrom by the actuation of pins 56 similarly roll rearwardly and enter pan 68 through said opening 22. From this pan the balls enter the upper portion of pipe 70 and the cycle of operation is repeated. Rod 85 which extends into said pan adjacent to the junction thereof with the open end of pipe 70 is actuated at each operation of lever 73 and serves to agitate the balls contained in said pan and also prevents jamming of the balls at the point of entrance to pipe 70.

Our device is so constructed that it requires various degrees of skill to play it successfully, its operating mechanisms are so arranged that the danger of the device getting out of order is reduced to minimum, and the device is protected against tampering.

While we have shown and described the preferred form of our invention, it is obvious that various changes in the construction and arrangement of parts can be made and substituted for those herein disclosed without departing from the spirit of the invention.

We claim:

1. An amusement device comprising an anvil having an impact face, said anvil being mounted for adjustment so as to vary the inclination of said impact face, a plurality of steel balls, a plurality of ball receivers spaced suitably from said anvil, and means for discharging said steel balls against said anvil from a point spaced therefrom whereby said balls are caused to rebound, the adjustment of said anvil being such as to cause said balls to rebound into any one of said ball receivers.

2. An amusement device comprising an anvil having an impact face, said anvil being mounted for adjustment so as to vary the inclination of said impact face, a plurality of steel balls, a plurality of ball receivers spaced suitably from said anvil, means for discharging said steel balls against said anvil from a point spaced therefrom whereby said balls are caused to rebound, the adjustment of said anvil being such as to cause said balls to rebound into any one of said ball receivers, and means for returning the spent balls to said ball discharging means.

3. An amusement device comprising a support having an inclined floor, an anvil adjustably mounted in said support and having its face presented upwardly through an opening formed in said floor, a plurality of steel balls, and means for raising said balls a suitable distance above said anvil and discharging them singly thereonto, said anvil being adjustable to vary the direction in which said balls rebound therefrom.

4. An amusement device comprising a support having an inclined floor, an anvil adjustably mounted in said support and having its face presented upwardly through an opening formed in said floor, a plurality of ball receivers mounted on said floor and extending upwardly therefrom in spaced relation with said anvil, a glass bowl arranged on said support and extending upwardly from said floor and enclosing said ball receivers and said anvil, and means for raising said balls a suitable distance above said anvil and discharging them thereagainst, said anvil being adjustable to cause said balls to rebound in the direction of any one of said receivers.

5. An amusement device of the class described including an adjustable steel anvil, a plurality of ball receivers arranged in spaced-apart relationship with said anvil and with each other, and a plurality of steel balls adapted to be dropped upon said anvil and deflected thereby in suitable directions towards the various ball receivers.

6. An amusement device comprising a support having a floor inclined from horizontal, an anvil mounted in said support and having its impact face presented upwardly through an opening in said floor, a plurality of steel balls, a receptacle for said balls disposed below the discharge opening formed in the lowermost portion of said floor, and means for raising said balls from said receptacle to a point above said anvil and discharging them singly thereagainst, said anvil being adjustable whereby the direction of rebound of said balls can be regulated.

7. An amusement device comprising a support having a floor inclined from horizontal, an anvil mounted in said support and having its impact face presented upwardly through an opening in said floor, a plurality of steel balls, a receptacle for said balls disposed below the discharge opening formed in the lowermost portion of said floor, means for raising said balls from said receptacle to a point above said anvil and discharging them singly thereagainst, and a plurality of ball receivers arranged on said floor in spaced relation with said anvil, the latter being adjustable whereby the direction of rebound of said balls can be regulated to cause said balls to be deposited in any one of said receivers.

8. An amusement device comprising a support having a floor inclined from horizontal, an anvil mounted in said support and having its impact face presented upwardly through an opening in said floor, a plurality of steel balls, a receptacle for said balls disposed below the discharge opening formed in the lowermost portion of said floor, means for raising said balls from said receptacle to a point above said anvil and discharging them singly thereagainst, a plurality of ball receivers arranged on said floor in spaced relation with said anvil, the latter being adjustable whereby the direction of rebound of said balls can be regulated to cause said balls to be deposited in any one of said receivers, and means associated with each receiver for retaining the balls deposited therein, said means being operable to release said balls whereby the latter roll upon said inclined floor toward said discharge opening into the receptacle.

9. In an amusement device of the class described the combination of a support provided with a lower and an upper compartment, a glass bowl enclosing said upper compartment, a ball discharging means and a ball receiving means arranged in said upper compartment, mechanism in said lower compartment for conveying balls to said ball discharging means, a circular casing enclosing said lower compartment, said casing having its upper end engaging the lower end of said bowl whereby the latter cannot be removed without first removing said casing, and means in said lower compartment for securing said casing against removal.

10. In an amusement device of the class described, the combination of a support provided with a lower and an upper compartment, a glass bowl enclosing said upper compartment, a ring fixed to the lower end of said bowl, a ball discharging means and a ball receiving means arranged in said upper compartment, mechanism in said lower compartment for conveying balls to said ball discharging means, a circular casing enclosing said lower compartment, said casing having its upper end flanged laterally for engaging said ring whereby said bowl cannot be removed without first removing said casing, means in said lower compartment for securing said casing against removal, said means being adapted to be operated by a tool inserted through an aperture in said casing, a plate arranged in said lower compartment and movable into position to close the communication between said aperture and said securing means, and a tumbler lock for operating said plate and locking it in closing position.

ALEXANDER H. SULLIVAN.
PAUL J. McCULLOUGH.